United States Patent
Trimberger

(10) Patent No.: US 6,654,889 B1
(45) Date of Patent: Nov. 25, 2003

(54) METHOD AND APPARATUS FOR PROTECTING PROPRIETARY CONFIGURATION DATA FOR PROGRAMMABLE LOGIC DEVICES

(75) Inventor: Stephen M. Trimberger, San Jose, CA (US)

(73) Assignee: Xilinx, Inc., San Jose, CA (US)

(*) Notice: Subject to any disclaimer, the term of this patent is extended or adjusted under 35 U.S.C. 154(b) by 0 days.

(21) Appl. No.: 09/253,401

(22) Filed: Feb. 19, 1999

(51) Int. Cl.[7] ................................................. H04L 9/32
(52) U.S. Cl. ........................ 713/191; 713/189; 713/188
(58) Field of Search .................. 713/188, 189, 713/191

(56) References Cited

U.S. PATENT DOCUMENTS

| | | | |
|---|---|---|---|
| 3,849,760 A | 11/1974 | Endou et al. ............... | 382/205 |
| 4,405,829 A | 9/1983 | Rivest et al. | |
| 5,084,636 A | 1/1992 | Yoneda ....................... | 307/465 |
| RE34,363 E | 8/1993 | Freeman ..................... | 307/465 |
| 5,237,218 A | 8/1993 | Josephson et al. .......... | 307/465 |
| 5,237,219 A | 8/1993 | Cliff ............................ | 307/465 |
| 5,343,406 A | 8/1994 | Freeman et al. ............ | 364/490 |
| 5,349,249 A | 9/1994 | Chiang et al. ............... | 307/465 |
| 5,369,708 A | 11/1994 | Kawamura et al. | |
| 5,388,157 A * | 2/1995 | Austin ........................... | 380/4 |
| 5,394,031 A | 2/1995 | Britton et al. ................. | 326/38 |
| 5,457,408 A | 10/1995 | Leung ........................... | 326/38 |
| 5,623,549 A | 4/1997 | Ritter | |
| 5,705,938 A | 1/1998 | Kean ............................ | 326/39 |
| 5,768,372 A | 6/1998 | Sung et al. | |
| 5,774,544 A | 6/1998 | Lee et al. ........................ | 380/4 |
| 5,838,901 A | 11/1998 | Curd et al. .................. | 395/186 |
| 6,002,769 A | 12/1999 | McGough | |
| 6,081,597 A | 6/2000 | Hoffstein et al. | |
| 6,298,137 B1 | 10/2001 | Hoffstein et al. | |

FOREIGN PATENT DOCUMENTS

| | | |
|---|---|---|
| EP | 0253530 | 6/1987 |
| WO | WO92/20157 | 11/1992 |
| WO | WO94/10754 | 11/1993 |
| WO | WO94/01867 | 1/1994 |

OTHER PUBLICATIONS

Meneze et. al. Handbook of Applied Cryptography pp. 2–5, 24–25 and 364–367.*

Wolfgang Hoflich, Applications Note, "Using the XC4000 Readback Capability", XAPP 015.000, 1993, available from Xilinx, Inc., 2100 Logic Drive, San Jose, CA 95124, pp. 8–37 to 8–44.

(List continued on next page.)

Primary Examiner—Gail Hayes
Assistant Examiner—James Seal
(74) Attorney, Agent, or Firm—Arthur Joseph Behiel; Lois D. Cartier

(57) ABSTRACT

Described are a method of programming a programmable logic device using encrypted configuration data and a programmable logic device (PLD) adapted to use such encrypted data. A PLD is adapted to include a decryptor having access to a non-volatile memory element programmed with a secret decryption key. Some or all of the decryptor can be instantiated in configurable logic on the FPGA. Encrypted configuration data representing some desired circuit functionality is presented to the decryptor. The decryptor then decrypts the configuration data, using the secret decryption key, and configures the FPGA with the decrypted configuration data. Some embodiments include authentication circuitry that performs a hash function on the configuration data used to instantiate the decryptor on the PLD. The result of the hash function is compared to a proprietary hash key programmed into the PLD. Only those configuration data that produce the desired hash result will instantiate decryptors that have access to the decryption key.

16 Claims, 5 Drawing Sheets

OTHER PUBLICATIONS

Bruce Schneier, "Applied Cryptography", Second Edition, 1996, published by John Wiley & Sons, Inc., pp. 193–197 and 265–285.

Ann Duncan, Application Note, "DES Encryption and Decryption on the XC6216", available from Xilinx, Inc., 2100 Logic Drive, San Jose, CA 95124, XAPP 106, Feb. 2, 1998 (version 1.0), pp. 1–7.

"The Programmable Logic Data Book", published Sep., 1996, in its entirety and also specifically pp. 4–54 to 4–79 and 4–253 to 4–286, available from Xilinx, Inc., 2100 Logic Drive, San Jose, California 95124.

Xilinx, Inc.; "The Programmable Logic Data Book"; published Sep. 1996; available from Xilinx, Inc., 2100 Logic Drive, San Jose, California 95124; in its entirety and also specifically pp. 4–54 to 4–79 and 4–253 to 4–286.

Xilinx, Inc.; "Core Solutions Data Book"; published May 1997; available from Xilinx, Inc., 2100 Logic Drive, San Jose, California 95124; pp. 2–5 to 2–13.

Xilinx, Inc.; "The Programmable Logic Data Book"; published 1994; available from Xilinx, Inc., 2100 Logic Drive, San Jose, California 95124; pp. 2–105 to 2–132 and 2–231 to 2–238.

D.D. Gajski, V.M. Milutinovic, H.J. Siegel, and B.P. Furht; "Tutorial—Computer Architecture"; Published by IEEE Computer Society Press, Copyright 1987; pp. v–i.

Gediminas P. Kurpis, Chair and Christopher J. Booth, Editor; "The New IEEE Standard Dictionary of Electrical and Electronics Terms"; Fifth Edition, published Jan. 15, 1993; p. 1011.

"IEEE Standard Test Access Port and Boundary–Scan Architecture", IEEE Std. 1149.1–1990; published Oct. 21, 1993; IEEE Computer Society; pp. 1–1 thru 1–5, 2–1 thru 2,6, 3–1 thru 3–9, 4–1 thru 4–3, 5–1 thru 5–16, 7–1 thru 7–28.

David A. Patterson and John L. Hennessy; "Computer Architecture A Quantitative Approach"; published by Morgan Kaufmann Publishers, Inc., San Mateo, California; published 1990; pp. 200–201.

Betty Prince; "Semiconductor Memories—A Handbook of Design, Manufacture, and Application"; published by John Wiley & Sons; Copyright 1983, 1991; pp. 149–174.

Paul R. Gray, David A. Hodges, Robert W. Brodersen; "Analog MOS Integrated Circuits—Potential of MOS Technologies for Analog Integrated Circuits"; IEEE Press, The Institute of Electrical and Electronics Engineers, Inc., New York; Copyright 1980; pp. 2–11.

Xilinx, Inc,; The Programmable Logic Data Book 1998; Copyright 1998; available from Xilinx, Inc., 2100 Logic Drive, San Jose, California 95124; pp. 4–56 thru 4–59.

* cited by examiner

METHOD AND APPARATUS FOR PROTECTING PROPRIETARY CONFIGURATION DATA FOR PROGRAMMABLE LOGIC DEVICES

FIELD OF THE INVENTION

This invention relates generally to programmable logic devices, and in particular to methods and apparatus for encrypting data used to configure programmable logic devices to protect that data from theft.

BACKGROUND

FIG. 1 depicts an example of a chip set 100 that includes some general-purpose read-only memory (ROM) 110 connected to a general-purpose FPGA 120. FPGA 120 conventionally includes an array 130 that can be configured to implement custom functional circuitry 140. Array 130 is typically an array of configurable logic blocks (CLBs) programmably interconnected to each other and to programmable input/output blocks (IOBs). For a more detailed discussion of FPGAs, see the co-pending U.S. Pat. No. 6,028,445 which issued on Feb. 22, 2000, "ecoder Structure and Method for FPGA Configuration," by Gary R. Lawman, which is incorporated herein by reference.

A vendor may use a chip set similar to chip set 100 to supply any number of different circuit designs while stocking only a single general-purpose FPGA and some general-purpose memory. The vendor supplies a customer with a custom version of chip set 100 by simply programming ROM 110 with the configuration data required to implement the customer's desired function.

Configuration data are typically downloaded into an FPGA (or other type of programmable logic device) as a series of bits known as a configuration bitstream. Anyone having access to the configuration bitstream for a particular design can easily copy the design. In the foregoing example in which a vendor sells a custom circuit as a set of configuration data combined with a general-purpose FPGA, an unscrupulous customer could easily copy the configuration data and use it to program any number of additional FPGAs. A Design is may also be stolen by reverse engineering the design from the configuration bitstream and then adapting the design for another FPGA or even a different circuit technology. Naturally, developers of custom configuration data for use in programmable chip sets are concerned for the security of their designs.

Some customers develop their own circuit designs and implement them on FPGAs. Designing complex circuits from basic logic gates, or "primitive cells," can be very time consuming. More complex functions called macros, or "cores," are therefore developed to represent more complex logic functions. These cores can then be used as building blocks for assembling yet more complex circuit designs.

A number of core developers design and market cores for FPGAs and other types of programmable logic devices (PLDs). Customers purchase these cores and use them to program PLDs to achieve desired functions. For example, a collection of cores for implementing standard bus interfaces and signal-processing functions is available from Xilinx, Inc., of San Jose, Cali., under the name LogiCORE™. As with the configuration data in the example of FIG. 1, PLD cores and circuit designs that employ them are easily stolen. Core developers are therefore concerned for the security of their cores. There is therefore a need for a means of securing cores and other proprietary configuration data.

SUMMARY

The present invention is directed to a method of configuring a programmable logic device using encrypted configuration data, and to a programmable logic device adapted to use such encrypted configuration data.

In one embodiment, a type of programmable logic device commonly known as a field-programmable gate array (FPGA) is adapted to include a decryptor and a non-volatile memory element programmed with a secret decryption key. Some or all of the decryptor can be instantiated in configurable logic on the FPGA. Once the decryptor is instantiated, encrypted configuration data representing some desired circuit function is presented to the decryptor. The decryptor then decrypts the configuration data, using the secret decryption key, and configures the FPGA with the decrypted configuration data.

For implementations in which the decryptor is instantiated in configuration memory of the FPGA, a clever thief might engineer an FPGA design that, when instantiated, simply reads the decryption key and presents the key on an output pin of the FPGA. To forestall such a security breach, an FPGA in accordance with a second embodiment of the invention includes authentication circuitry that performs a hash function on the configuration data used to instantiate the decryptor. The result of the hash function is compared to a proprietary hash key programmed into a second non-volatile memory element on the FPGA. Only those decryptors whose configuration data produce the desired hash result will have access to the decryption key.

DETAILED DESCRIPTION

Figure 1:
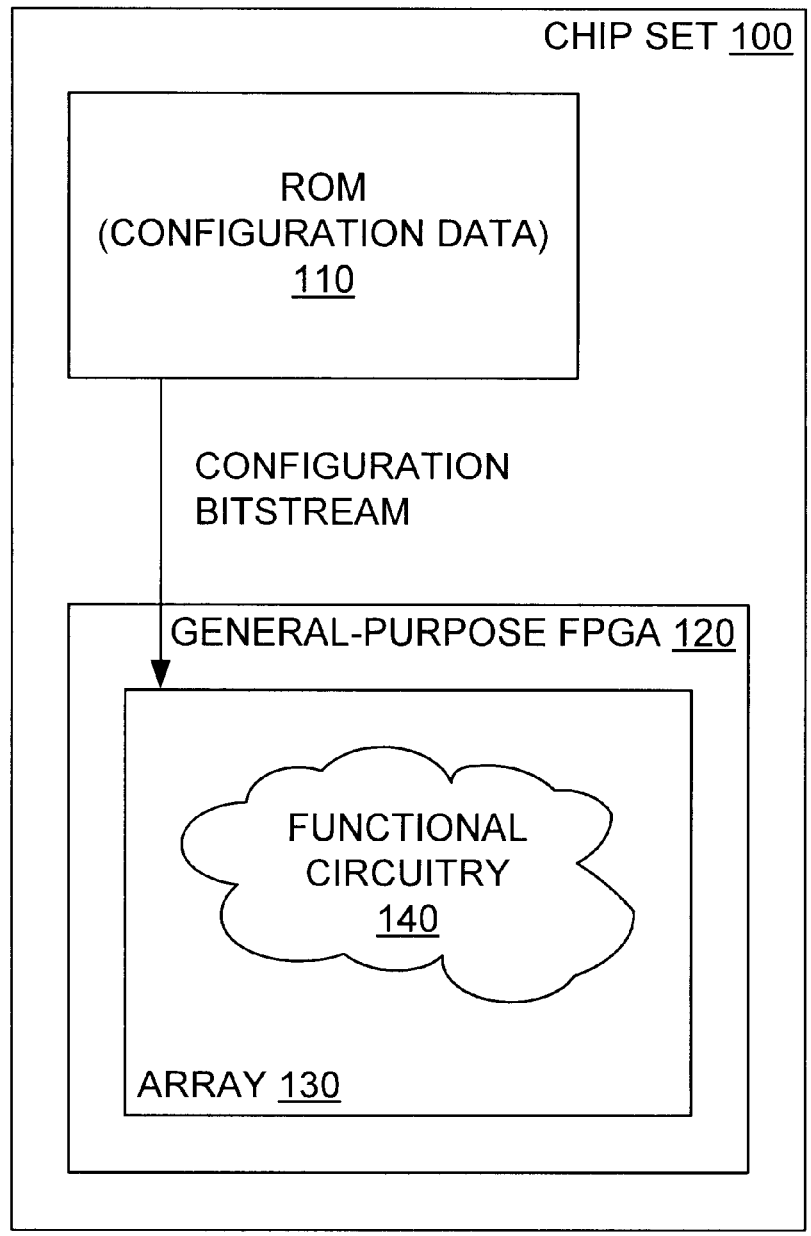
FIG. 1 depicts an example of a conventional chip set 100 that includes some general-purpose read-only memory (ROM) 110 connected to a general-purpose FPGA 120.
Figure 2:
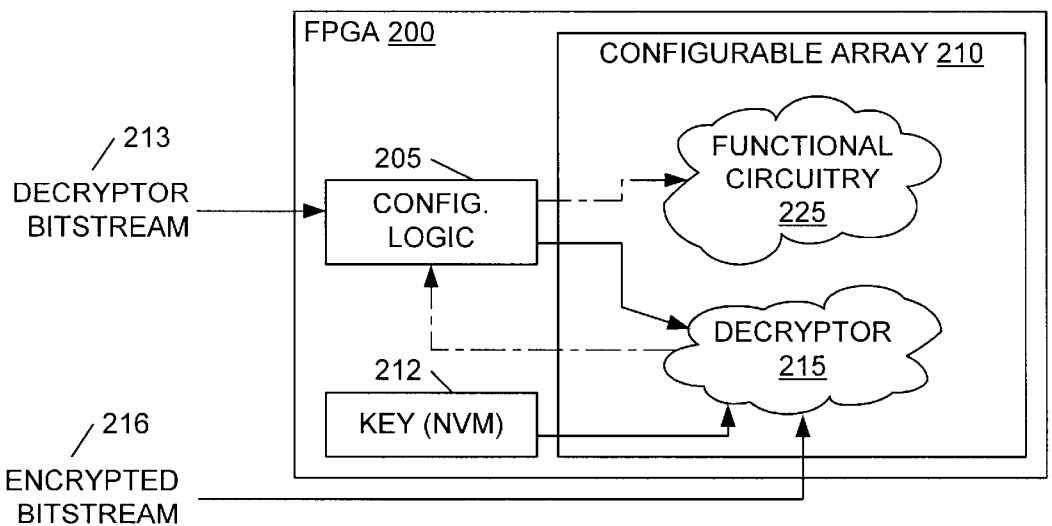
FIG. 2 is a block diagram of an FPGA 200 in accordance with an embodiment of the present invention.

FIG. 2 shows an FPGA 200, which includes configuration logic 205 and an array 210 of configurable elements. Although not shown, configurable array 210 typically includes CLBs, interconnect lines, and IOBs similar to those described above in connection with FIG. 1. FPGA 200 is configured by loading one or more configuration bitstreams into internal memory cells in array 210 that define how the CLBs, interconnect lines, and IOBs of array 210 are configured. FPGA 200 also includes some non-volatile memory 212 adapted to include a decryption key.

In accordance with the invention, FPGA 200 is configured using two configuration bitstreams. The first, a decryptor bitstream 213, includes configuration data designed to instantiate a decryptor 215 in array 210. The second, an encrypted bitstream 216, is encrypted configuration data designed to instantiate some desired functional circuitry 225 in array 210. Encrypted bitstream 216 might represent proprietary bus-interface logic, for example.

FPGA 200 is programmed by first supplying decryptor bitstream 213 to configuration logic 205. Configuration logic 205 uses decryptor bitstream 213 to instantiate a decryptor 215 within array 210. Encrypted bitstream 216, for implementing the proprietary functional circuitry, is then presented to an input terminal of decryptor 215. Decryptor 215 uses a pre-programmed key in non-volatile memory (NVM) 212 to decrypt encrypted bitstream 216 and present the resulting decrypted bitstream to configuration logic 205. Configuration logic 205 then uses the decrypted bitstream to instantiate proprietary functional circuitry 225. Dashed arrows in FIG. 2 depict the data path along which encrypted bitstream 216 is decrypted and instantiated as functional circuitry 225.

In reference to FIG. 1, a vendor might sell the general-purpose chip set 100 with some proprietary configuration data stored in ROM 110. In accordance with the invention, the proprietary data can be encrypted and FPGA 100 modified to include non-volatile memory 212 programmed with a secret decryption key. The encrypted configuration data would only work with those FPGAs programmed to include the correct key. Thieves will therefore find it very difficult to copy the configuration data.

Figure 3:
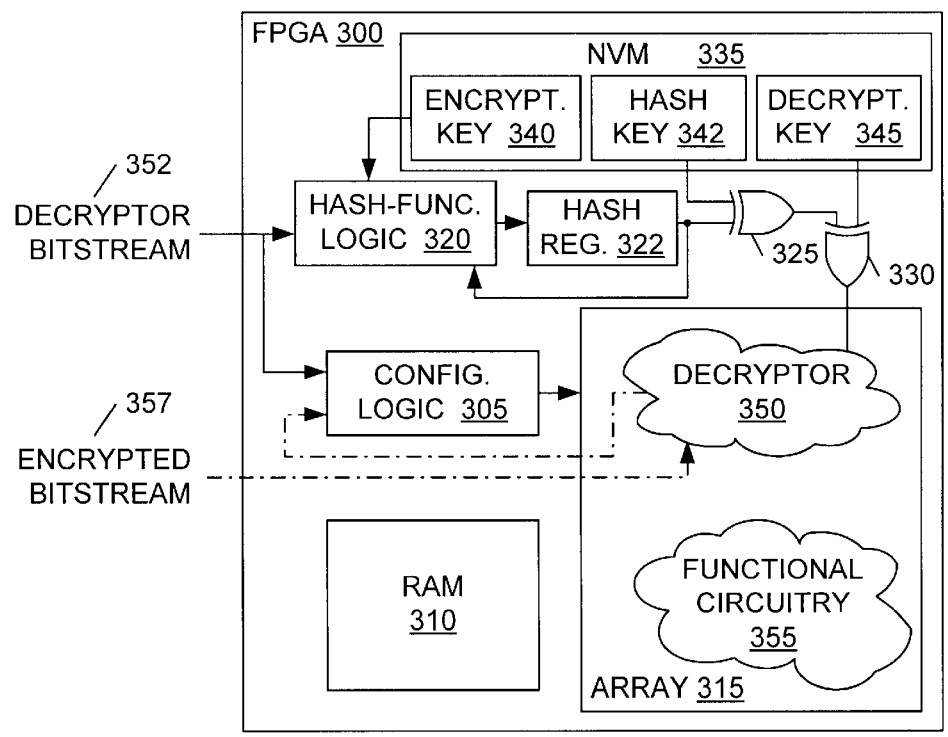
FIG. 3 is a block diagram of an FPGA 300 in accordance with another embodiment of the present invention.

FIG. 3 shows an FPGA 300 that includes configuration logic 305, random-access memory (RAM) 310, and an array 315 of configurable logic. In accordance with the invention, FPGA 300 additionally includes hard-wired hash-function logic 320, a hash register 322, a pair of XOR gates 325 and 330, and non-volatile memory (NVM) 335. NVM 335, in turn, includes memory locations 340, 342, and 345 for storing respective encryption, hash-function, and decryption keys. NVM 335 may be, for example, conventional flash, antifuse, or mask programmed memory. Also in accordance with the invention, array 315 includes a decryptor 350 derived from a decryptor bitstream 352 and some proprietary functional circuitry 355 derived from an encrypted bitstream 357. In one embodiment, FPGA 300 is one of the Virtex™ family of FPGAs available from Xilinx, Inc.

Figure 4:
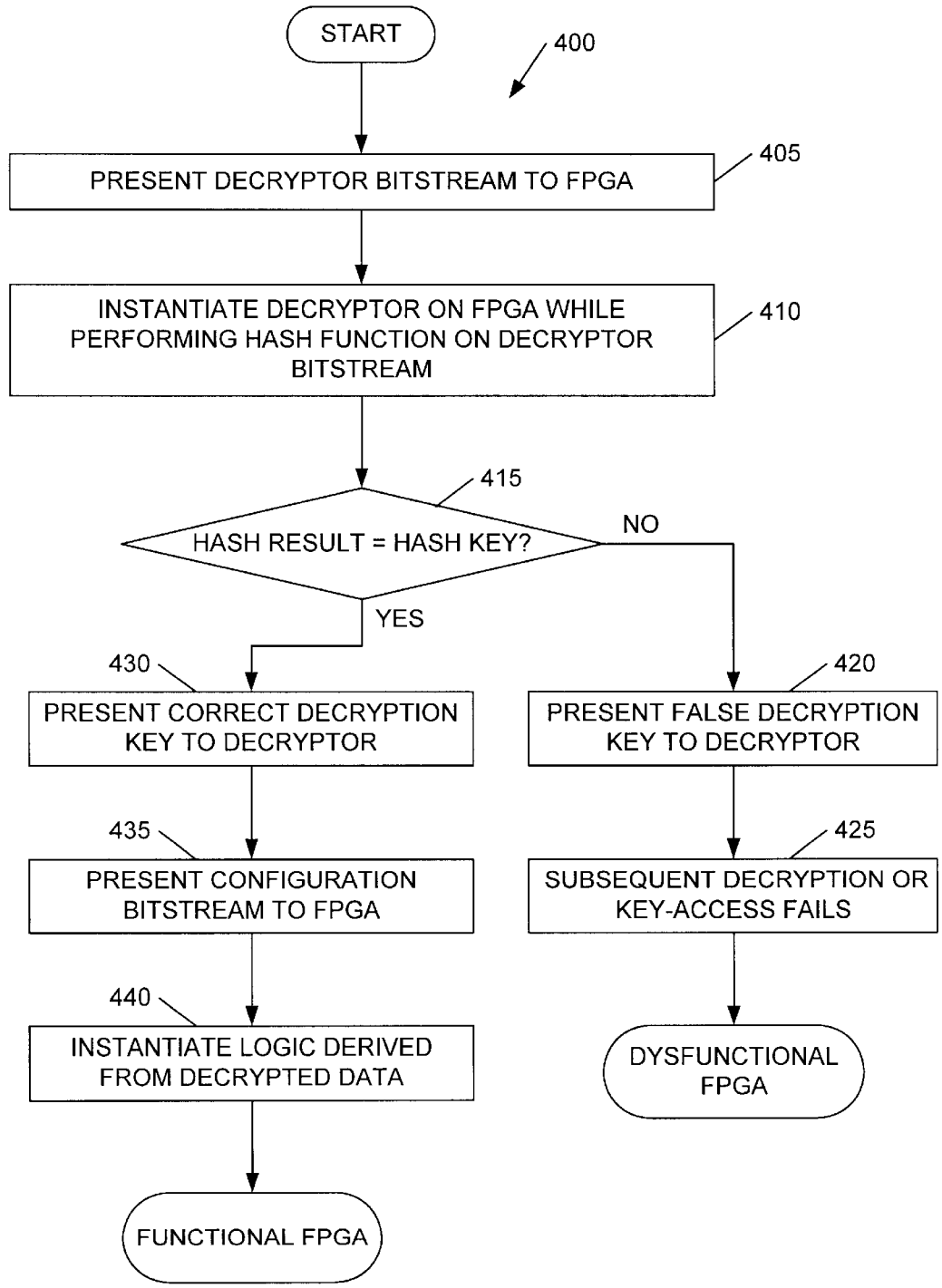
FIG. 4 is a flowchart 400 depicting the process of programming FPGA 300 of FIG. 3 to include a decryptor and some functional circuitry.

FIG. 4 is a flowchart 400 depicting the process of programming FPGA 300 of FIG. 3 to include decryptor 350 and functional circuitry 355. This process is performed automatically each time FPGA 300 is powered on or reset. Beginning with step 405, decryptor bitstream 352 is presented to a designated I/O pin of FPGA 300. Configuration logic 305 uses decryptor bitstream 352 to instantiate decryptor 350 into array 315. Decryptor bitstream 352 is sent "in the clear," meaning that it is not encrypted. Transmitting decryptor bitstream 352 in the clear is not considered a breach of security because cryptographers assume that everyone knows the encryption algorithm. The security lies in the secrecy of decryption key 345.

A clever thief might engineer an FPGA design that, when instantiated into array 315, simply reads decryption key 345 and presents the key on an output pin. To forestall such a security breach, FPGA 300 authenticates decryptor 350 by performing a hash function on decryptor bitstream 352 while configuration logic 305 instantiates decryptor 350 (step 410). The result of the hash function, the "hash result," is stored in hash register 322 and compared to the proprietary hash key 342 (step 415). Only those bitstreams that produce the desired hash result will provide access to decryption key 345. In one embodiment, hash-function logic 320 encrypts the incoming decryptor bitstream using a technique commonly known as cipher-block chaining (CBC). This embodiment is described below in connection with FIGS. 6A and 6B.

If in step 415 the hash result in hash register 322 does not match hash key 342, then the incorrect key (or no key) is presented to the instantiated decryptor (step 420). Without access to the correct decryption key 345, any subsequent attempt to decrypt an incoming encrypted bitstream 357 will fail (step 425), resulting in a dysfunctional FPGA. If the hash result in hash register 322 matches hash key 342, then the correct decryption key 345 is presented to the instantiated decryptor 350 (step 430).

Encrypted bitstream 357, representing the proprietary functional circuitry 355, is presented to the instantiated decryptor 350 in the FPGA (435). With access to the correct decryption key 345, decryptor 350 will correctly decrypt encrypted bitstream 357 and provide the resulting decrypted bitstream to an input terminal of configuration logic 305. Finally, configuration logic 305 configures array 315 using the decrypted bitstream to instantiate functional circuitry 350 (step 440), resulting in a functional FPGA.

FPGA 300 includes one example of circuitry designed to deny decryption-key access to unauthenticated circuits. Hash-function logic 320 stores the hash result from decryptor bitstream 352 in hash register 322. XOR gate 325 then compares the hash result in hash register 322 with the secret hash key 342. If the hash result and hash key match, then XOR gate 325 outputs a logic zero to a first input terminal of XOR gate 330. If, on the other hand, the hash result in hash register 322 and hash key 342 do not match; then XOR gate 325 outputs a logic one to the first input terminal of XOR gate 330.

Decryption key 345 connects to the second input terminal of XOR gate 330. XOR gate 330 outputs decryption key 345 when the input terminal from XOR gate 325 is a logic zero, and outputs an inverted version of decryption key 345 when the input terminal from XOR gate 325 is a logic one. As discussed above, XOR gate 325 provides a logic zero to XOR gate 330 only when the hash result in hash register 322 matches hash key 342. Thus, XOR gate 330 will only present the correct decryption key if the hash function of decryptor bitstream 352 matches hash key 342.

For illustrative purposes, XOR gates 325 and 330 are each shown to include two input terminals and one output terminal. However, XOR gates 325 and 330 typically include a number of input terminal pairs and an equal number of output terminals. In one embodiment, for example, each of XOR gates 325 and 330 includes 64 pairs of input terminals and 64 output terminals. In that embodiment, XOR gate 330 compares a 64-bit hash result in hash register 322 with a 64-bit hash key 342. If any bit does not match, then the corresponding output bit from XOR gate 325 will be a logic one. Consequently, the signal on the corresponding output terminal from XOR gate 330 will be logically opposite the appropriate decryption key bit, and the circuit instantiated by the bitstream that produced the incorrect hash result will not have access to the correct decryption key.

While the output terminal of hash key 342 and hash register 322 represent the same number of bits as decryption key 345, this need not be the case. In one embodiment, for example, the parallel output terminals of XOR gate 325 are ORed and the result is presented to one half the inputs to XOR gate 330. Thus configured, if any bit of hash key 342 does not match the output terminal of hash register 322, then one half of inputs to XOR gate 330 will be logic ones. XOR gate 330 will therefore invert decryption key 345. Alternatively, the output terminals of the added OR gate could be fed to the inputs of a second OR gate substituted for XOR gate 330. In that case, a mismatch between hash key 342 and hash register 322 will cause all logic ones to be presented to decryptor 350 in lieu of the correct decryption key (presumably, decryption key 345 is not selected to be all ones).

FPGA 300 includes block RAM 310. Some embodiments of the invention take advantage of block RAM 310 by storing some decrypted configuration data in block RAM 310. Then, once decryptor 350 is no longer needed, the configuration data in block RAM 310 is used to configure the portion of array 315 in which decryptor 350 resided. This process allows for more efficient use of array 315. Alternatively, the portion of array 315 in which decryptor 350 resides can be programmed in the clear after decryptor 350 decrypts functional circuitry 355.

A DES algorithm is used, in one embodiment, to encrypt the bitstream used to instantiate functional circuitry 225 (FIG. 2) and functional circuitry 355 (FIG. 3). Decryptors 215 and 350 of FIGS. 2 and 3 perform the inverse of the same DES function to decrypt encrypted bitstreams. The DES algorithm is well known to those of skill in cryptography.

Figure 5:
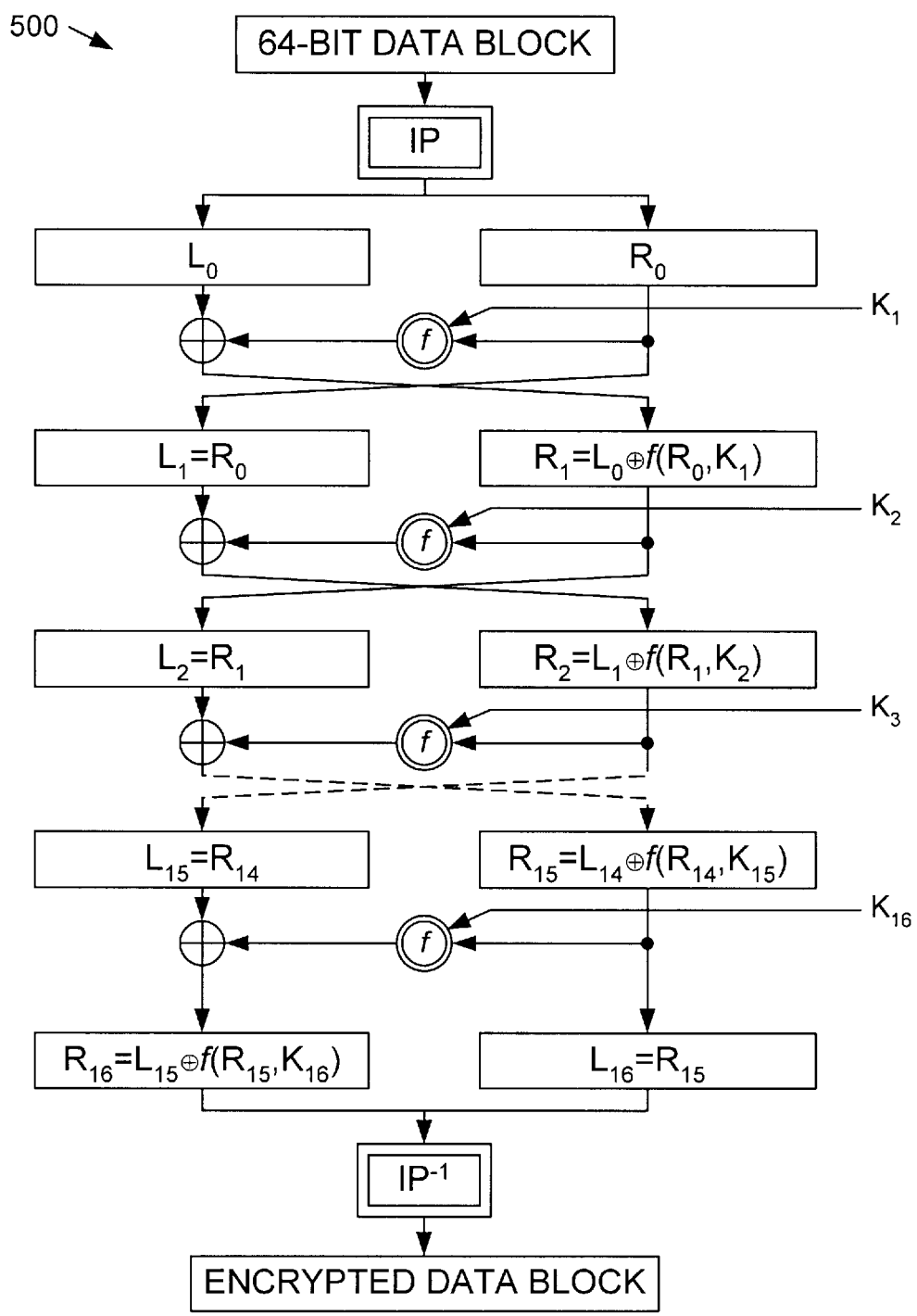
FIG. 5 is a flowchart 500 summarizing the conventional Data Encryption Standard (DES) encryption algorithm.

FIG. 5 is a flowchart 500 summarizing the Data Encryption Standard (DES) encryption algorithm. For a detailed treatment of DES, used both for encryption and decryption, see "Applied Cryptography, Second Edition: Protocols, Algorithms, and Source Code in C," by Bruce Schneier (1996). Pages 265–285 of Schneier relate specifically to DES, and are incorporated herein by reference. A Xilinx application note entitled "DES Encryption and Decryption on the XC6216," by Ann Duncan (Feb. 2, 1998), describes the design and implementation of DES encryption/decryption on an XC6216™ FPGA available from Xilinx, Inc. That application note is also incorporated herein by reference.

Figure 6A:
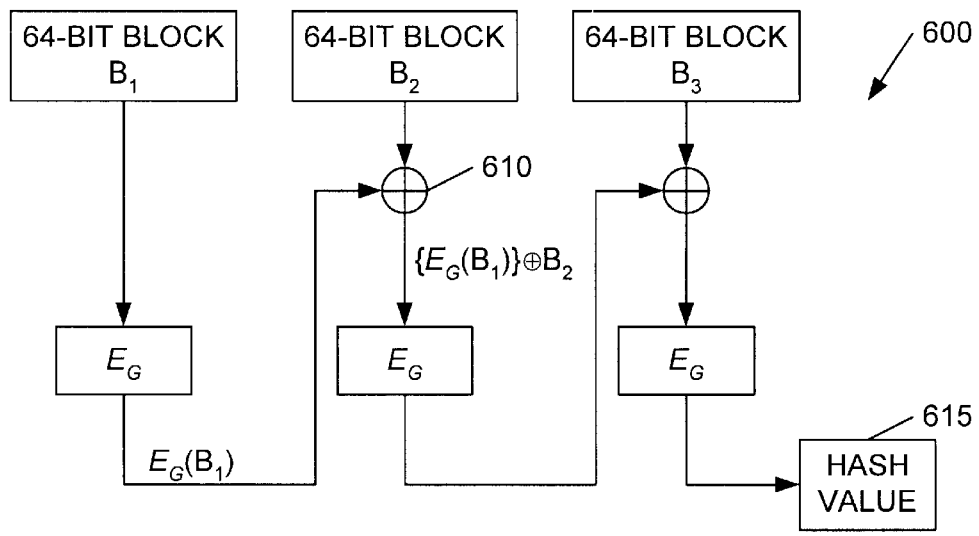
FIG. 6A is a block diagram 600 representing the hash function performed by hash-function logic 320 of FIG. 3.

FIG. 6A is a block diagram 600 representing the hash function performed by hash-function logic 320 of FIG. 3. For simplicity, the bitstream in the illustrated example consists of three 64-bit data blocks $B_1$, $B_2$, and $B_3$; the hash function can be extended to any number and size of data blocks. In one embodiment, hash-function logic 320 uses a cipher-block chaining method outlined in the above-cited Schneier reference on e.g. pages 193–197. Those pages are incorporated herein by reference.

The first data block $B_1$ is encrypted using a conventional encryption algorithm $E_G$, in one embodiment the DES algorithm described above in connection with FIG. 5. This encryption employs a secret encryption key "G" (encryption key 340 of FIG. 3, for example) to encrypt the first data block $B_1$. The resulting encrypted 64-bit block $E_G(B_1)$ is then XORed with the second data block $B_2$, the XOR function being represented by a conventional XOR symbol 610. The resulting 64-bit value, $\{E_G(B_1)\} \oplus B_2$ is then XORed with the next, data block $B_3$ and the result is subjected to the encryption algorithm $E_G$ to produce the hash value. This process, conventionally known as cipher block chaining, produces a 64-bit hash value 615 that depends upon all of data blocks $B_{1-3}$.

Figure 6B:
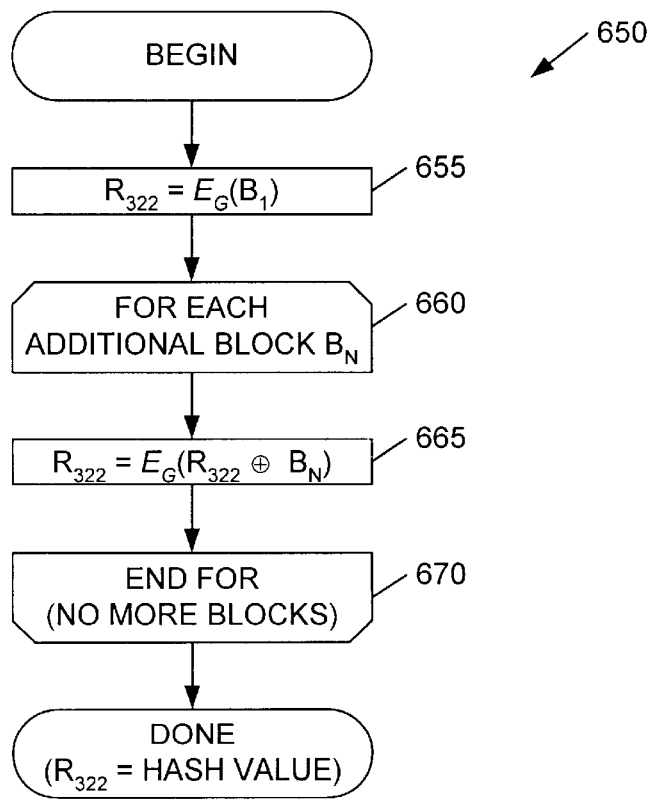
FIG. 6B is a flowchart 650 illustrating a method of performing the hash function of FIG. 6A on a decryptor bitstream made up of an arbitrary number of 64-bit data blocks.

FIG. 6B is a flowchart 650 illustrating a method of performing the hash function of FIG. 6A on a decryptor bitstream made up of an arbitrary number of 64-bit data blocks. This method is implemented by hash-function logic 320 of FIG. 3 in one embodiment of the invention.

In step 655, hash-function logic 320 encrypts the first 64-bit data block of an incoming decryptor bitstream and stores the resulting encrypted data in hash register 322 (i.e., $R_{322}$). Then, for each additional block $B_N$, hash-function logic 320:

1. performs a 64-bit exclusive OR (XOR) of the contents of register 322 and the additional block $B_N$;
2. encrypts the contents of hash register 322 using encryption key G; and
3. stores the result, $E_G(R_{322} \oplus B_N)$, back in hash register 322.

The foregoing procedures are represented in FIG. 6B as the "For" loop that includes steps 660, 665, and 670.

When no more data blocks are available (e.g., when hash-function logic 320 reaches the end of the decryptor bitstream 352), hash register 322 contains the hash value of decryptor bitstream 352. As discussed above in connection with FIG. 3, XOR gate 325 compares hash value in hash register 322 with hash key 342 to ensure that decryptor bitstream 352 represents an authorized decryptor. If not, then XOR gate 330 presents the wrong decryption key to instantiated decryptor 350.

Some PLDs are designed to respond to a "readback" command by outputting a bitstream (the readback data) that includes the configuration data of the PLD. The readback command is disabled on devices implementing the present invention to prevent a thief from simply reading back the decrypted configuration data. Alternatively, an encryptor could be instantiated on a PLD to re-encrypt configuration data readout of the PLD. For more information relating to readback operations on Xilinx XC4000™ series FPGAs, see Xilinx, Inc., "The Programmable Logic Data Book" (1998), pp. 4–56 to 4–59, and Wolfgang Hoflich, "Using the XC4000™ Readback capability," XAPP 015.000, pp. 8–37 to 8–44 (1993). Both of these documents are available from Xilinx, Inc., of San Jose, Calif., and are incorporated herein by reference.

Various nodes within FPGA 300 must be protected from observation to avoid compromising security. These nodes include the output terminals of proprietary keys 340, 342, and 345 of NVM 335 and the output terminal of decryptor 350. Care should therefore be taken to ensure that such nodes are not and cannot be configured to be accessed via any input/output pins of FPGA 300.

Some configuration information is easily observed once the FPGA is operational. For example, one can measure the voltage on an input/output block of an FPGA to determine whether that input/output block is configured to include a pull-up resistor. If this observable data is a result of some decryption, skilled cryptologists can make use of this data to learn something about the decryption process, and possibly to breach security. It may be desired, therefore, to identify those bits of configuration data that can be easily observed once the FPGA is configured and to transmit those data in the clear. Of course, the encryptor and decryptor must both understand which data is to be transmitted in the clear and which is to be encrypted.

Hash-function logic 320 and decryptors 215 and 350 are not limited to the DES algorithm; other types of algorithms—many of which are well known—can also be used. For example, a public-key algorithm such as RSA (named for its creators X-480 Rivest, Shamir, and Adleman) can be used for both encryption and decryption. FPGA vendors could then program a private key into non-volatile memory on the FPGA and core developers could use a corresponding public key to encrypt their designs. Moreover, several decryption keys can be stored in each FPGA so that a different key can be used in the event that one of the keys is stolen.

Configuring an FPGA to include a decryptor, as opposed to fabricating the FPGA with a hard-wired decryptor, saves valuable die area and allows users to select appropriate encryption/decryption schemes. For example, some desirable algorithms are not approved for export. A user may therefore select an approved decryptor for export and select another algorithm for local sale. Alternatively, a distributer of FPGAs can simply sell standard FPGAs and allow purchasers to select the appropriate legal decryption scheme that provides a desired level of security.

While the present invention has been described in connection with specific embodiments, variations of these embodiments will be obvious to those of ordinary skill in the art. For example, 1. some FPGAs might be programmed with additional keys to support multiple decryptors or hash functions;
2. the decryptor and encrypted bitstreams can be combined into a single bitstream;
3. decryption and hash keys could be implemented using digital logic integrated with other PLD circuits to make the key values more difficult to discover by reverse engineering (e.g., a decryption key could be nodes of a logic circuit integrated into the decryptor).

Moreover, some components are shown directly connected to one another while others are shown connected via intermediate components. In each instance the method of interconnection establishes some desired electrical communication between two or more circuit nodes, or terminals. Such communication may often be accomplished using a number of circuit configurations, as will be understood by those of skill in the art. Therefore, the spirit and scope of the appended claims should not be limited to the foregoing description.

What is claimed is:

1. A programmable logic device comprising:
   a. an input pin adapted to receive encrypted configuration data;
   b. a non-volatile memory element adapted to store a decryption key;
   c. a decryptor having a first input terminal adapted to receive the encrypted configuration data, a second input terminal adapted to access the decryption key, and an output terminal, wherein the decryptor is adapted to decrypt the encrypted configuration data and to provide resulting decrypted configuration data on the output terminal;
   d. an array of configurable logic programmed to implement the decryptor, wherein at least a portion of the decryptor is instantiated in the array of configurable logic; and
   e. configuration logic having an input terminal connected to the decryptor output terminal and an output terminal connected to the array, the configuration logic being adapted to receive the decrypted configuration data and to configure the array as directed by the decrypted configuration data.

2. The programmable logic device of claim 1, further comprising hash-function logic adapted to authenticate the portion of the decryptor.

3. The programmable logic device of claim 2, further comprising a second non-volatile memory element connected to the hash-function logic, the second non-volatile memory element adapted to store a hash key.

4. The programmable logic device of claim 2, further comprising a second non-volatile memory element connected to the hash-function logic, the second non-volatile memory element adapted to store an encryption key.

5. A programmable logic device comprising:
   a. non-volatile memory adapted to include a secret key;
   b. an array of programmable logic configured to include a decryptor, the decryptor including:
      i. a first input terminal adapted to receive encrypted configuration data;
      ii. a second input terminal connected to the non-volatile memory and adapted to receive the secret key;
      iii. decryption circuitry providing a decrypted version of the encrypted configuration data based on the secret key; and
      iv. an output terminal adapted to provide e the decrypted version of the encrypted configuration data; and
   c. configuration logic having a configuration logic input terminal adapted to receive the decrypted version of the encrypted configuration data.

6. The programmable logic device of claim 5, further comprising a plurality of pins adapted to provide electrical access to and from the programmable logic device from circuits external to the programmable logic device, wherein the output terminal of the decryptor is not connected to any one of the pins.

7. A method of configuring a programmable logic device to perform a desired logic function, the method comprising:
   configuring configurable logic of the programmable logic device to include a decryptor;
   sending encrypted configuration data to the decryptor;
   decrypting the encrypted configuration data to produce decrypted configuration data representing the desired logic function; and
   configuring the programmable logic device to perform the desired logic function using the decrypted configuration data.

8. The method of claim 7, further comprising removing the decryptor after decrypting the encrypted configuration data.

9. The method of claim 7, wherein configuring the programmable logic device to include a decryptor comprises providing a bitstream representing the decryptor to the programmable logic device.

10. The method of claim 9, wherein configuring the programmable logic device to include a decryptor further comprises performing a hash function on the bitstream representing the decryptor to authenticate the decryptor.

11. The method of claim 10, wherein performing the hash function produces a hash result, the method further comprising comparing the hash result with a hash key to authenticate the decryptor.

12. The method of claim 11, further comprising providing the decryptor access to a decryption key only if the hash result matches the hash key.

13. A system comprising:
   a programmable logic device having an input terminal; and
   a memory having an output terminal connected to the input terminal of the programmable logic device, the memory programmed to include:
      decryptor data adapted to instantiate a decryptor in configurable logic of the programmable logic device; and
      encrypted configuration data adapted to instantiate a desired logic function in the programmable logic device.

14. A system for protecting configuration data adapted to instantiate a desired logic function in a programmable logic device, the system comprising:

means for encrypting the configuration data;

means for configuring configurable logic of the programmable logic device to include a decryptor;

means for sending the encrypted configuration data to the decryptor to produce decrypted configuration data; and means for instantiating the desired logic function using the decrypted configuration data.

15. The system of claim 14, further comprising means for removing the decryptor after configuring the programmable logic device to perform the desired function.

16. The system of claim 14, further comprising means for authenticating the decryptor.

* * * * *